Figure 1:
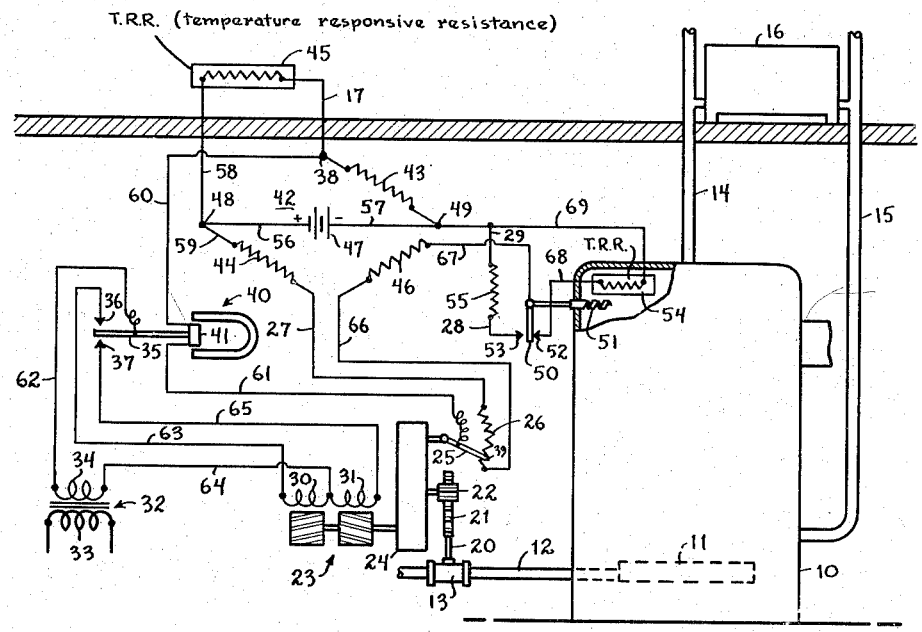

Jan. 2, 1945. W. H. GILLE 2,366,501
CONTROL SYSTEM
Filed March 7, 1941

INVENTOR
Willis H. Gille
BY
George H. Fisher
ATTORNEY

Patented Jan. 2, 1945

2,366,501

UNITED STATES PATENT OFFICE 2,366,501

CONTROL SYSTEM

Willis H. Gille, St. Paul, Minn., assignor to Minneapolis-Honeywell Regulator Company, Minneapolis, Minn., a corporation of Delaware Application March 7, 1941, Serial No. 382,267

8 Claims. (Cl. 236—91)

This invention relates to control systems in general, and particularly to condition control systems wherein the condition responsive element is an electrical resistance.

An object of the present invention is to provide a system for controlling a condition changing means in accordance with the magnitude of the condition to be controlled, wherein improved means is provided for compensating the control effect of a given control condition magnitude in accordance with the magnitude of a second condition which affects said control condition.

Another object of the present invention is to provide a bridge circuit including two condition responsive resistances, and wherein means is provided for limiting the unbalancing effect of one of said resistances.

A further object of the invention is to provide a condition responsive control system in which means is provided for compensating the control effect in accordance with a second condition when said second condition lies within a predetermined range of values.

A further object of the invention is to provide a control system operated in accordance with the unbalance of a resistance bridge circuit, having a first resistance responsive to a condition to be controlled and a second resistance element responsive to a compensating condition, wherein means is provided to switch said second element out of the bridge circuit when the compensating condition departs from a predetermined range of values. A still further object is to provide such a system wherein the switching is done by means responsive to said compensating condition.

A further object of the invention is to provide a temperature control system wherein a temperature changing means is controlled in accordance with the integrated effects of a plurality of temperature responsive elements, and wherein means is provided for terminating the effect of certain of said elements when the temperatures to which said certain elements are responsive depart from a predetermined range.

A further object of the invention is to provide a system for controlling a heater in accordance with the temperature of the space being heated, wherein means is provided to compensate the control effect of the space temperature in accordance with a condition indicative of the quantity of heat stored in said heater. A still further object is to provide, in such a system, means for terminating the compensating effect when the quantity of stored heat drops below a predetermined value.

A further object is to construct an air cooling system controlled in accordance with the temperature of the space to which the cooled air is supplied, wherein means is provided for compensating the cooling effect in accordance with the outside air temperature, and wherein means is provided to terminate the compensating effect when the outside air temperature drops below a predetermined value.

Figure 2:
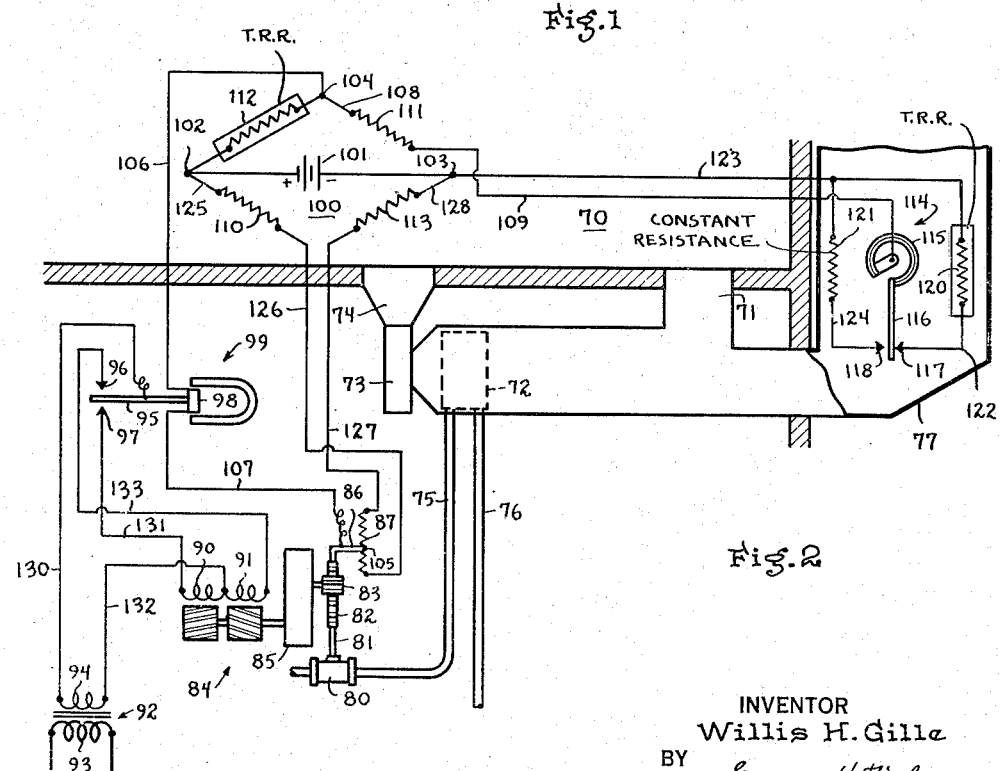

Other objects and advantages of my invention will become apparent from a consideration of the accompanying specification and drawing, in which Figure 1 represents diagrammatically a heat control system embodying my invention, and Figure 2 represents diagrammatically an air conditioning system embodying my invention.

Figure 1

In Figure 1 is shown a furnace 10 having a burner 11 to which fuel is supplied through a pipe 12, and the supply of fuel is controlled by a valve 13. A heat transfer medium, for example, hot water, is delivered from the furnace 10 through a pipe 14 to a radiator 16 located in the space to be heated. After the water in the radiator 16 has given up its heat to the space, it is returned to the furnace 10 through a return pipe 15.

The valve 13 is one of a type which modulates the flow of fuel through it and is operated by a stem 20 which is provided at its upper end with a rack 21. The rack 21 is driven by a pinion 22 which is operated by a motor generally indicated at 23, through a gear train, schematically shown at 24. A sliding contact arm 25 is also connected to the gear train 24 so as to be moved across a slide wire resistance 26 upon operation of the motor 23. The motor has two windings 30 and 31 which drive the motor in opposite directions when energized. The motor 23 is supplied with energy by a transformer 32 having a primary winding 33 and a secondary winding 34.

Operation of the motor 23 is controlled by a galvanometer 40, having a moving coil 41 operatively connected to a switch arm 35 so as to selectively engage said arm with a pair of stationary contacts 36 and 37.

The galvanometer 40 is connected by conductors 60 and 61 to output terminals 38 and 39, respectively, of a bridge circuit generally indicated at 42. It should be noted that output terminal 39 is the point of engagement of switch arm 25 with resistance 26.

The bridge circuit 42 is supplied with electrical energy by a battery or other source indicated at 47, which is connected to input terminals 48 and 49 by means of conductors 56 and 57, respectively.

A resistance element 45, of a material such as nickel, having an appreciable temperature coefficient of resistance, is exposed to the temperature in the space being heated. One terminal of this resistor 45 is connected to input terminal 48 by a conductor 58, and its opposite terminal is connected to output terminal 38 by a conductor 17. This resistor 45, with its connections, thereby forms an arm of the bridge circuit 42. This is the upper left arm, as the circuit appears in the drawing.

The upper right arm of the bridge circuit includes a fixed resistance 43, which is connected at its opposite ends to output terminal 38 and input terminal 49.

The lower left arm of the bridge circuit is connected to input terminal 48 and output terminal 39, and includes a conductor 59, a fixed resistor 44, a conductor 27, and a variable portion of the slidewire resistance 26.

The lower right arm of the bridge is connected to output terminal 39 and input terminal 49, and includes a portion of resistance 26, a conductor 66, a fixed resistor 46, a conductor 67, and a switch arm 50. If the switch arm 50 is in engagement with a contact 52, as shown in the drawing, the fourth arm of the bridge also includes a conductor 68, a temperature responsive resistance element 54, and a conductor 69. On the other hand, if the switch arm 50 is in engagement with a contact 53, the fourth arm of the bridge does not include the elements last recited, but instead includes a conductor 28, a fixed resistor 55, and a conductor 29.

The resistor 54 is of nickel or some other material having an appreciable temperature coefficient of resistance, and is exposed to a temperature indicative of the quantity of heat stored in the heating system, which may conveniently be the temperature of the water or other heat transfer medium in the furnace 10.

The switch arm 50 is operated to engage selectively the contacts 52 and 53 by a thermostatic element 51, which is exposed to the same temperature as the resistor 54. The thermostatic element 51 is set to keep the switch arm 50 in engagement with contact 52 as long as the furnace temperature remains above a predetermined value, say 150°. When the furnace temperature is below that value, the thermostatic element moves switch arm 50 into engagement with contact 53.

As is well known in the art, the bridge circuit 42 is said to be balanced when its output terminals 38 and 39 are at the same potential, so that no current flows through the output circuit which includes conductors 60 and 61 and the galvanometer 40. This balanced condition is reached when the ratios between the resistances on the two sides of the bridge are the same. In the bridge circuit shown, the terminal voltage of the source 47 is divided, on the upper side of the bridge, between the resistor 45 and the resistor 43. On the lower side of the bridge, this terminal voltage of the source 47 is divided between the resistor 44 and a portion of resistor 26 on the one hand, and the remainder of resistor 26, resistor 46, and either resistor 54 or 55 on the other. When the ratio between the resistances of resistor 45 and resistor 43 is the same as the ratio between the resistances of the two lower arms of the bridge, the voltage is divided between them in the same manner, and the output terminals 38 and 39 are therefore at the same potential.

When the temperature adjacent the resistor 45 increases, its resistance increases, and hence the ratio between the resistances of the two upper arms is changed. The potential of the output terminal 38 changes toward the potential of the input terminal 49. If the polarity of the source is that indicated by the legend in the drawing, this change makes terminal 38 more negative than terminal 39, and a current flows in the output circuit in a direction from terminal 39 to terminal 38. When the temperature adjacent resistor 45 decreases, its resistance decreases, the potential of output terminal 38 becomes more positive than that of output terminal 39, and a current flows in the output circuit in the opposite direction, from terminal 38 to terminal 39.

If the resistor 54 is connected in the circuit, and the temperature adjacent it increases, its resistance increases, and the division of voltage on the lower side of the bridge is changed so as to make terminal 39 more positive than terminal 38. This causes a flow of current in the output circuit from terminal 39 to terminal 38. On the other hand, when the temperature adjacent resistor 54 decreases, its resistance decreases, and hence the potential of terminal 39 becomes more negative, causing an output current to flow from terminal 38 to terminal 39.

It may be seen, therefore, that a rise in temperature adjacent resistor 45 has the same effect on the output of the bridge circuit as a rise in temperature adjacent resistor 54, since a rise in either place causes a flow of current from terminal 39 to terminal 38. The effect of a drop in temperature at either place is likewise the same.

*Operation of Figure 1*

When the parts are in the position shown in the drawing, the temperature in the space being heated is slightly above the value which it is desired to maintain. The resistance of resistor 45 is therefore above its normal value. The valve 13 is nearer its closed position than its open position. The switch arm 25 is at a point along the slide wire 26 such that most of the resistance of the slide wire 26 is in series with the fixed resistor 44, rather than in series with the resistor 46. Because of this position of the arm 25, the increased resistance of resistor 45 is counteracted and the bridge circuit is balanced. The temperature of the heating medium in the furnace 10 is above the predetermined level at which the thermostat 51 acts to move the switch blade 50 against the stationary contact 52.

Let it now be assumed that the temperature in the space being heated begins to decrease. This results in a decrease in the resistance of the resistor 45, and the potential of the output terminal 38 of the bridge circuit 42 increases with respect to the potential of the output terminal 39. Because of this increase in potential, a current flows from output terminal 38 to output terminal 39 through the bridge output circuit which may be traced from terminal 38 through conductor 60, moving coil 41 of the galvanometer 40, and conductor 61 to output terminal 39. This current flowing through the moving coil 41 causes it to move the switch arm 35 into engagement with contact 36.

Engagement of switch arm 35 with contact 36 completes an energizing circuit for motor winding 30. This circuit may be traced from the left hand end of secondary winding 34, as it appears in the drawing, through a conductor 62, switch arm 35, contact 36, a conductor 63, motor winding 30, and a conductor 64 to the right hand end of secondary winding 34. As a result of the energization of motor winding 30, the motor 23 drives the pinion 22 and hence the rack 21 so as to move the valve 13 toward open position. This increases the supply of fuel to the burner 11 of the furnace 10. At the same time, the switch arm 25 is driven upward along the slide wire 26, thus reducing the resistance between input terminal 48 and output terminal 39 of the bridge circuit 42. When this movement has continued far enough so that the potential of output terminal 39 equals that of output terminal 38, the current ceases flowing in the moving coil 41 of the galvanometer 40. The coil 41 then returns to its neutral position, where the switch arm 35 is in engagement with neither of the contacts 36 or 37. The motor winding 30 is then deenergized, and movement of the valve 13 and of the switch arm 25 stops.

The bridge 42 is now balanced at a new temperature condition of the resistor 45, and a position of the valve 13 corresponding to the new temperature condition has been attained. The valve position is always such as to tend to restore the temperature of the space being heated to its desired value.

Similarly, an increase in the temperature adjacent resistor 45 causes increase in its resistance, and a corresponding decrease in the potential of output terminal 38 with respect to the output terminal 39. This causes a current to flow through the galvanometer coil 41 in the opposite direction, and the galvanometer reacts so as to move the switch arm 35 against the contact 37. This completes an energizing circuit for winding 31 of motor 23, which may be traced from the left hand end of secondary winding 34 through conductor 62, switch arm 35, contact 37, a conductor 65, winding 31, and conductor 64 to the right hand end of secondary winding 34. Energization of winding 31 causes motor 23 to operate in a direction opposite to that in which it operated upon energization of winding 30. Therefore, the valve 13 is moved towards closed position and the switch arm 25 is moved down the slide wire 26 until the increase in resistance in series with fixed resistor 44 has become sufficient to balance the increased resistance of resistor 45 and make the potential of output terminal 39 equal to the potential of output terminal 38. When this condition is reached, the current flowing through the moving coil 41 ceases, and the winding 31 is deenergized by separation of switch arm 35 from contact 37.

In the heating system described herein, as in all heating systems, operation of the furnace 10 causes the storage of heat in the heat transfer medium, in this case water. This heat stored in the transfer medium will be delivered to the space being heated at a later time dependent upon the inherent lag in the particular system under consideration. If no compensation is provided in the control system for this stored heat, its delayed delivery to the space being heated will cause a rise in the temperature of that space above the desired value which the control system is to maintain. It is therefore desirable that the control system be constructed so as to respond to an increase in the boiler water temperature in the same manner as it responds to an increase in the temperature of the space being heated. The variable resistor 54 is connected in the bridge circuit 42 to provide such compensation.

When the temperature of the boiler water adjacent to resistor 54 rises, its resistance increases, thereby increasing the resistance in the leg of the bridge between input terminal 49 and output terminal 39, and hence raising the potential of the output terminal 39 with respect to that of the output terminal 38. It may therefore be seen that an increase in the temperature of the boiler water adjacent the resistor 54 causes an unbalance of the bridge 42 in the same sense as that unbalance caused by an increase in the temperature adjacent resistor 45. Similarly, a decrease in temperature adjacent the resistor 54 causes an unbalance of the bridge circuit in the same sense as that caused by a decrease in the temperature adjacent the resistor 45.

During mild weather conditions, the furnace 10 may not be operated for considerable periods of time. Under such conditions, the boiler water may become quite cold while the temperature of the space being heated stays at or near the desired value. In the system described, the unbalance of the bridge circuit due to the cooling of the boiler water, with a resultant change in the resistance of the resistor element 54, may simulate a call for heat, and cause operation of the motor 23 so as to open the valve 13 and allow the heater 11 to heat the water in the boiler of the furnace 10. When this heat is transferred to the space through the radiator 16, it might cause an undesirable increase in the temperature of the space to an uncomfortable value.

I have provided means for preventing such an undesirable increase in the temperature of the space being heated by discontinuing the compensation of the control system for the temperature of the boiler water when that temperature falls below a predetermined value. The thermostatic element 51 is set so that when the boiler water falls below a certain value, for example, 150 degrees F., the switch arm 50 is moved out of engagement with the contact 52 and into engagement with the contact 53. This cuts the boiler water temperature compensating resistance 54 out of the bridge circuit, and substitutes the constant resistance 55 in the bridge circuit. The resistance 55 is chosen so that its resistance value is exactly equal to that of the resistance 54 at the temperature, namely, 150 degrees, at which the thermostat 51 is set to transfer these resistances in and out of the bridge circuit. This value of resistance 55 is chosen so as to avoid disturbance of the bridge circuit through operation of the switch 50.

When the temperature of the boiler water is below the predetermined level, given as 150 degrees in the present example, the system operates as an uncompensated bridge network and merely responds to changes in the temperature of the space being heated as reflected in changes in the resistance of the element 45. It has been found that the heat stored in the transfer medium when the latter is below a predetermined value has a negligible effect on the heating of the space, and need not be compensated for.

It will be seen therefore that I have provided a system wherein the temperature of the boiler water or other heat transfer medium, is compensated for when such compensation is needed, but in which the compensation is terminated automatically when it is not needed.

Figure 2

Figure 2 shows an air cooling system in which compensation is provided for outdoor temperature in accordance with my invention. In the system shown, the air in the space 70 is cooled by being drawn through an intake duct 71 past a cooling coil 72 through a fan 73 and back to the space 70 through an outlet duct 74. Cooling fluid is supplied to the coil 72 through a pipe 75 and is discharged therefrom through another pipe 76. The cooling fluid may be water or any suitable refrigerant. The air supplied to the space 70 is mixed with fresh air which reaches the coil 72 and fan 73 through the duct 77. The proportions of outside air and return air may be controlled by any of several means which are old in the art.

The supply of fluid through the pipe 75 is controlled by a modulating valve 80, which is moved by a stem 81 on which a rack 82 is mounted. The rack 82 is driven by a pinion 83 operated by a motor 84 through a gear train schematically indicated at 85. Rigidly mounted on the rack 82 for movement therewith is a slidable contact arm 86 which cooperates with a slide wire resistance 87.

The motor 84 is provided with a pair of windings 90 and 91 which drive the motor in opposite directions. Energy is supplied to the motor 84 from a transformer 92 having a primary winding 93 and a secondary winding 94. The supply of energy to the motor 84 is controlled by a switch arm 95 which selectively engages stationary contacts 96 and 97. This switch arm 95 is moutned for movement with the moving coil 98 of a galvanometer 99.

A temperature responsive bridge circuit 100 is provided, which is supplied with energy from a battery 101 through input terminals 102 and 103. The moving coil 98 of the galvanometer 99 is connected to the output terminals 104 and 105 of the bridge circuit 100 by means of conductors 106 and 107 respectively. It should be noted that output terminals 105 is the point at which the slidable contact 86 engages the slide wire resistance 87.

The upper left arm of the bridge circuit 100 connects input terminal 102 with output terminal 104 and comprises a temperature responsive resistor 112 exposed to the temperature of the space 70 which is being cooled.

The upper right arm of the bridge 100 connects output terminal 104 with input terminal 103 and includes a conductor 108, a fixed resistor 111, a conductor 109, a bimetallic element 115, and a switch arm 116 operated thereby. If the switch arm 116 is in engagement with contact 117, this arm of the bridge circuit also includes a conductor 122, a temperature responsive resistance element 120, and a conductor 123 connected to input terminal 103. On the other hand, if the switch arm 116 is in engagement with contact 118, this arm of the bridge includes in lieu of the elements last described, a conductor 124, a fixed resistor 121, and the said conductor 123.

The temperature responsive resistance element 120 is exposed to the temperature of the outside air being drawn into the system through the duct 77. The bimetallic element 114 is exposed to the same temperature, and is set to operate the switch arm 116 against contact 117 when the outside air temperature is above a predetermined value, for example, 85° F., and to move the switch arm 116 against contact 118 when the outside temperature is below that predetermined value.

The lower left arm of bridge circuit 100 connects input terminal 102 with output terminal 105, and includes a conductor 125, a fixed resistor 110, a conductor 126, and a variable portion of slidewire resistance 87.

The lower right arm of bridge circuit 100 connects output terminal 105 with input terminal 103 and includes a variable portion of slidewire resistance 87, a conductor 127, a fixed resistor 113, and a conductor 128.

A rise in the temperature of space 70 causes an increase in the resistance of element 112. This makes output terminal 104 more negative than output terminal 105, and therefore, causes a current to flow from terminal 105 to terminal 104 through the output circuit including conductor 107, galvanometer coil 98, and conductor 106. Similarly, a drop in temperature of space 70 causes a decrease in resistance of element 112. This makes terminal 104 more positive than terminal 105, and causes a flow of current in the output circuit in the opposite direction.

A rise in the outside air temperature, when resistance 120 is connected in the system, causes an increase in the resistance of that element. This makes terminal 104 more positive than terminal 105, and causes an output current to flow from terminal 104 to terminal 105. When the outside temperature drops, the resistance of element 120 decreases, and an output current is thereby caused to flow from terminal 105 to terminal 104.

It may therefore be seen that the effect of a rise in outside temperature affects the bridge circuit 100 in a manner opposite to the effect produced by a rise in inside temperature.

*Operation of Figure 2 species*

When the parts are in the position shown in Figure 2, the temperature of the space 70 is slightly below the value which it is desired to maintain, and the control system has therefore moved the valve 80 so that it is slightly nearer its closed position than its median position. The resistance of the element 112 is at this time slightly below the value it has when the temperature of the space 70 is at its predetermined level and the slidable switch arm 86 has been moved by the control system so as to reduce the resistance between the input terminal 102 and the output terminal 105 of the bridge circuit so that the potentials of the output terminals 104 and 105 are equal.

The outside air temperature is above the predetermined value at which switch arm 116 is engaged with contact 117, and temperature responsive resistance element 120 is therefore connected in the circuit.

Let it be assumed that the temperature of space 70 now begins to increase. As it increases, the resistance of element 112 increases, and, as previously explained, this causes a flow of current in the output circuit of bridge 100 from terminal 105 to terminal 104. This current, flowing through the galvanometer coil 98, causes switch arm 95 to be moved against contact 97. This completes an energizing circuit for winding 90 of motor 84, which may be traced from the left hand end of secondary winding 94 through a conductor 130, switch arm 95, contact 97, a conductor 131, winding 90, and a conductor 132 to the right hand end of secondary winding 94. Energization of winding 90 causes motor 84 to rotate in a direction such that pinion 83 drives rack 82 to open the valve 80 and increase the supply of cooling fluid. At the same time, the switch arm 105 is driven upwards along the slidewire resistance 87, thereby increasing the resistance in the lower left arm of the bridge 100. This action continues until the bridge is rebalanced, and the flow of current in the output circuit stops. When this current stops flowing, switch arm 95 is moved out of engagement with contact 97, and winding 90 is deenergized.

In a similar manner, a decrease in the temperature of the space 70 causes a decrease in resistance of element 112 and a flow of current in the bridge output circuit from terminal 104 to terminal 105. This current, flowing through coil 98 of galvanometer 99, causes movement of switch arm 95 into engagement with contact 96. This completes an energizing circuit for winding 91 which may be traced from the left hand end of secondary winding 94 through conductor 130, switch arm 95, contact 96, a conductor 133, winding 91, and conductor 132 to the right hand end of secondary winding 94. Energization of winding 91 causes motor 84 to drive valve 80 towards closed position, and simultaneously move slider 105 along resistance wire 87 so as to rebalance the bridge circuit.

It may be noted that the only difference in the operation of the bridge circuit 100 of Figure 2, as compared to the operation of the bridge circuit 42 of Figure 1, is that a decrease in temperature of the space 70 causes the valve 80 to be closed slightly, rather than opening wider on a decrease in temperature as was the case in Figure 1. Similarly, when a rise in the temperature of the space 70 occurs the valve 80 is moved to a wider open position. This difference is of course, due to the fact that the system in Figure 2 is a cooling system while the system of Figure 1 is a heating system. This difference of operation is obtained, as is well known in the art, by reversing the connections between the motor windings and the controlling switch contacts, and also between the rebalancing slidewire resistor and the bridge circuit.

In an air cooling system such as this, it is desirable on extremely hot days to increase the temperature maintained by the system in the space 70, in order that an excessive shock may not be experienced by people entering the space from the outside and by people leaving the space and going outside. Operation in this manner is also more economical, as a comfortable inside temperature may be maintained, without the expenditure of a large amount of energy in the cooling system. It is the function of the resistance 120 in this system to compensate the bridge circuit 100 for changes in outside temperature so as to produce in effect a change in the setting of the system in such a manner that it maintains a higher temperature in the space 70 when the outside temperature is high than it does when the outside temperature is low. As previously explained, an increase in outside air temperature causes a current to flow in the output circuit from the terminal 104 to the terminal 105. This response of the bridge circuit is the same that would occur if the inside temperature should fall with a consequent decrease in the resistance of the element 112. It will be seen, therefore, that the cooling effect produced in response to a given inside temperature is reduced by an increase in the outside temperature.

When the outside temperature falls below a certain optimum value, for instance, 85°, it is no longer desirable to compensate the action of the cooling system for changes in the outside temperature. If the cooling is set to maintain the inside temperature at 70°, for example, it is not necessary to compensate for outside temperatures below 85° as a change in temperature of only 15° is not sufficient to cause discomfort. Furthermore, such compensation might cause undesirable reduction of the space temperature below 70°. I have therefore provided the thermostat 114 which is set to operate when the outside temperature falls below 85° so as to move the switch arm 116 out of engagement with the contact 117 and into engagement with the contact 118. This switching operation disconnects resistance element 120 from the bridge circuit and substitutes resistance element 121. The resistance element 121 is so chosen that its resistance is constant and is exactly equal to that of the resistance element 120 at 85°. It may therefore be seen that this switching does not cause any unbalance of the bridge circuit as it merely consists in substituting one resistance for another of equal value in the circuit.

When the outside temperature is below 85°, the system acts as an uncompensated bridge circuit, and tends to maintain the space temperature at its predetermined value, which has been indicated as 70° by way of example.

Other modifications of my invention will readily occur to those skilled in the art. For instance, if it were desired to provide both upper and lower limits to the range of values during which compensation is effective, it would be a simple matter to add a second thermostat in series with one stationary contact of the compensating thermostat shown. Also, it might be desirable to provide an electronic amplifier, or a sensitive relay mechanism, connected to the bridge output in order to control a motor, instead of the simple switching mechanism disclosed.

My invention might also be used to provide a high limit control for a heating system. For instance, in the system of Fig. 1, the thermostat 51 might be arranged to keep the constant resistance 55 normally in the system, and to substitute therefor a temperature responsive resistance upon the occurence of a predetermined high temperature, say 180°, in the furnace. Further rise in furnace temperature would then cause a decrease in the fuel supply to the furnace, as previously described.

While I have shown and described preferred embodiments of my invention, I desire to be limited only by the scope of the appended claims.

I claim as my invention:

1. In a system for controlling the temperature of a space, heating means, an electrical bridge circuit, a first resistance element in said circuit having an appreciable temperature coefficient of resistance and exposed to the temperature of said space, a second resistance element variable in accordance with the magnitude of a condition indicative of the quantity of heat stored in said heating means, a third resistance element substantially constant in value and equal to the value of said second element when said condition reaches a critical value, switch means for selectively connecting said second and third elements in said bridge circuit, means responsive to the value of said condition and effective when said condition passes through said critical value to operate said switch means, and means responsive to the unbalance of said bridge circuit for controlling said heating means.

2. In combination, means having a variable output for changing the temperature of a space, an electrical bridge circuit, a first resistance element in said circuit having an appreciable temperature coefficient of resistance and exposed to the temperature of said space, a second resistance element having an appreciable temperature coefficient of resistance and exposed to a temperature indicative of a need for a change in the relationship between said space temperature and the output of said temperature changing means, a third resistance element of substantially constant value, a switch for selectively connecting said second and third elements in said bridge circuit, a thermostat exposed to said last-mentioned temperature for operating said switch, and means responsive to unbalance of said bridge circuit for controlling the output of said temperature changing means.

3. In combination, means having a variable output for changing the temperature of a space, an electrical bridge circuit, a first resistance element in said circuit having an appreciable temperature coefficient of resistance and exposed to the temperature of said space, a second resistance element having an appreciable temperature coefficient of resistance and exposed to a temperature indicative of a need for a change in the relationship between said space temperature and the output of said temperature changing means, a third resistance element of substantially constant value equal to that of said second element when said last-mentioned temperature reaches a predetermined limiting value, a switch for selectively connecting said second and third elements in said bridge circuit, a thermostat exposed to said last-mentioned temperature for operating said switch to place said third element in said circuit when said last-mentioned temperature exceeds said limiting value, and means responsive to unbalance of said bridge circuit for controlling said temperature changing means.

4. Electrical control apparatus, comprising in combination, condition changing means, first impedance means variable in magnitude in accordance with a first condition indicative of the need for operation of said condition changing means, second impedance means variable in magnitude in accordance with a second condition indicative of the need for operation of said condition changing means, an electrical network including both said impedance means for producing an electrical quantity variable in accordance with the resultant of said two conditions, means responsive to said electrical quantity for modulatingly varying the output of said condition changing means, and means responsive to said second condition and effective when said second condition departs from a predetermined range of values to effectively disconnect only the second of said impedance means from said network.

5. Control apparatus, comprising in combination, condition changing means, means responsive to a first condition indicative of the need for operation of said condition changing means for producing a first control effect modulatingly variable in magnitude in accordance with the value of said first condition, means responsive to a second condition indicative of the need for operation of said condition changing means for producing a second control effect modulatingly variable in magnitude in accordance with the value of said second condition, means for combining said first and second control effects to produce a resultant control effect, means responsive to said resultant control effect for modulatingly varying the output of said condition changing means, and additional means responsive to said second condition and effective when said second condition departs from a predetermined range of values to discontinue said second control effect while permitting said first control effect to continue in control of said condition changing means.

6. Control apparatus, comprising in combination, condition changing means, means responsive to a first condition indicative of the need for operation of said condition changing means for modulatingly varying a first electrical quantity in accordance with the value of said first condition, means responsive to a second condition indicative of the need for operation of said condition changing means for modulatingly varying a second electrical quantity in accordance with the value of said second condition, means for combining said first and second electrical quantities to produce a resultant electrical quantity, means responsive to said resultant electrical quantity for modulatingly varying the output of said condition changing means, and additional means responsive to said second condition and effective when said second condition departs from a predetermined range of values to discontinue the variation of said second electrical quantity by said second condition responsive means, while permitting said first electrical quantity to continue in control of said condition changing means.

7. Electrical control apparatus, comprising in combination, condition changing means, electrical motor means for varying the output of said condition changing means, first impedance means variable in magnitude in accordance with a first condition indicative of the need for operation of said condition changing means, second impedance means variable in magnitude in accordance with a second condition indicative of the need for operation of said condition changing means, a normally balanced electrical network including both said impedance means, rebalancing impedance means variable by operation of said motor means and connected in said network, means responsive to unbalance of said network for controlling said motor means, and means responsive to said second condition and effective when said second condition departs from a predetermined range of values to effectively disconnect only the second of impedance means from said network.

8. In apparatus for controlling the temperature of a space, a control device for a furnace for heating said space, a first resistance element having a relatively high temperature coefficient of resistance and exposed to the temperature of said space, a second resistance element also having a relatively high temperature coefficient of resistance and exposed to a temperature of said furnace, means including both said resistance elements for controlling said control device, and means operative whenever the temperature of said furnace is below a predetermined value to prevent said control device from being affected by variations in the resistance value of said second resistance element while maintaining said first resistance element in control of said control device.

WILLIS H. GILLE.